(12) United States Patent
Sheynman et al.

(10) Patent No.: US 10,586,449 B2
(45) Date of Patent: *Mar. 10, 2020

(54) METHOD AND APPARATUS FOR SELECTIVELY USING DIFFERENT TYPES OF NETWORKS TO OBTAIN INFORMATION REGARDING ONE OR MORE TRAFFIC SIGNALS AND INTERSECTIONS

(71) Applicant: HERE GLOBAL B.V., Eindhoven (NL)

(72) Inventors: Arnold Sheynman, Northbrook, IL (US); Jingwei Xu, Buffalo Grove, IL (US); Weimin Huang, Summit, NJ (US); Bruce Bernhardt, Wauconda, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/251,899

(22) Filed: Jan. 18, 2019

(65) Prior Publication Data

US 2019/0156669 A1 May 23, 2019

Related U.S. Application Data

(63) Continuation of application No. 15/651,930, filed on Jul. 17, 2017, now Pat. No. 10,192,437.

(51) Int. Cl.
*G08G 1/0967* (2006.01)
*G08G 1/09* (2006.01)
(Continued)

(52) U.S. Cl.
CPC ..... *G08G 1/096783* (2013.01); *G08G 1/0145* (2013.01); *G08G 1/091* (2013.01);
(Continued)

(58) Field of Classification Search
CPC ................................. H04L 1/00; G08G 1/00
See application file for complete search history.

(56) References Cited

U.S. PATENT DOCUMENTS 9,432,929 B1 8/2016 Ross et al.
9,565,625 B1 2/2017 MacNeille et al.
(Continued)

FOREIGN PATENT DOCUMENTS

EP 3116158 1/2017
JP 2010/268334 11/2010
(Continued)

OTHER PUBLICATIONS

Abboud, K. et al., *Interworking of DSRC and Cellular Network Technologies for V2X Communications: A Survey*, IEEE (2016) 15 pages.

(Continued)

*Primary Examiner* — Shirley Lu
(74) *Attorney, Agent, or Firm* — Alston & Bird LLP

(57) ABSTRACT

A method, apparatus and computer program product are provided to selectively utilize one or more networks in order to reliably communicate the information regarding one or more traffic signals and one or more intersections controlled by respective traffic signals. In the context of a method, the method includes communicating with a first network in order to receive information with a mobile platform regarding one or more traffic signals and information regarding one or more intersections. At least one traffic signal is associated with a respective intersection. The method also includes identifying a first switching condition and communicating with a second network, different than the first network, in order to receive the information regarding the one or more
(Continued)

traffic signals and the information regarding the one or more intersections following identification of the first switching condition.

20 Claims, 4 Drawing Sheets

(51) Int. Cl.
| | | |
|---|---|---|
| | *G08G 1/095* | (2006.01) |
| | *G08G 1/01* | (2006.01) |
| | *H04W 4/80* | (2018.01) |
| | *H04W 4/44* | (2018.01) |
| | *H04W 48/18* | (2009.01) |
| | *H04W 88/06* | (2009.01) |
| | *H04L 29/08* | (2006.01) |
| | *G08G 1/07* | (2006.01) |

(52) U.S. Cl.
CPC ....... *G08G 1/095* (2013.01); *G08G 1/096758* (2013.01); *H04L 67/12* (2013.01); *H04W 4/44* (2018.02); *H04W 4/80* (2018.02); *H04W 48/18* (2013.01); *H04W 88/06* (2013.01); *G08G 1/07* (2013.01)

(56) References Cited

U.S. PATENT DOCUMENTS

| | | | |
|---|---|---|---|
| 2006/0009188 | A1 | 1/2006 | Kubota et al. |
| 2009/0315766 | A1* | 12/2009 | Khosravy .......... G06Q 30/0241 |
| | | | 342/357.64 |
| 2010/0309023 | A1 | 12/2010 | Busch |
| 2011/0098916 | A1 | 4/2011 | Jang |
| 2015/0170310 | A1 | 6/2015 | Amento et al. |
| 2015/0243165 | A1 | 8/2015 | Elsheemy |
| 2016/0328963 | A1 | 11/2016 | Yao et al. |
| 2017/0110008 | A1* | 4/2017 | Benhammou .......... G08G 1/012 |
| 2017/0132915 | A1* | 5/2017 | Cross .................... G08G 1/005 |
| 2017/0268896 | A1 | 9/2017 | Bai et al. |
| 2018/0005254 | A1 | 1/2018 | Bai et al. |

FOREIGN PATENT DOCUMENTS

| | | |
|---|---|---|
| WO | WO 2014/089384 | 6/2014 |
| WO | WO 2017/012468 A1 | 1/2017 |

OTHER PUBLICATIONS

Office Action for U.S. Appl. No. 15/651,930 dated Mar. 29, 2018.
International Search Report and Written Opinion for Application No. PCT/IB2018/055262 dated Nov. 6, 2018, 10 pages.
Notice of Allowance for U.S. Appl. No. 15/651,930 dated Sep. 6, 2018.

\* cited by examiner

METHOD AND APPARATUS FOR SELECTIVELY USING DIFFERENT TYPES OF NETWORKS TO OBTAIN INFORMATION REGARDING ONE OR MORE TRAFFIC SIGNALS AND INTERSECTIONS

CROSS-REFERENCE TO RELATED APPLICATIONS

This application is a continuation of U.S. application Ser. No. 15/651,930, filed Jul. 17, 2017, the entire contents of which are incorporated herein by reference.

TECHNOLOGICAL FIELD

An example embodiment of the present disclosure relates generally to the communication of information regarding one or more traffic signals and one or more intersections and, more particularly, the selective use of different types of networks to communicate information regarding one or more traffic signals and one or more intersections.

BACKGROUND

Intersections serve a critical role for traffic flow management. In this regard, an intersection having a traffic signal associated therewith provides well-defined intersection movement state control strategies to insure vehicle capacity within the intersection is not exceeded and to increase the likelihood that vehicles will propagate safely through the intersection.

Each traffic signal implements an assigned signal phase and timing (SPaT) control strategy. This SPaT control strategy defines the different signal phases of the traffic light, such as the red, yellow and green signal phases, as well as the relative timing of each phase. In some instances, the relative timing may be predefined such that each of the red, yellow and green signal phases has a respective predefined length. Alternatively, other traffic signals may be actuated, such as by traffic approaching and/or passing through the intersection. For a traffic signal that is actuated, the timing of the different signal phases may vary, such as between predefined maximum and minimum values, based upon the traffic flow therethrough.

Based upon information regarding the SPaT control strategy of a traffic signal as well as information regarding the intersection controlled by the traffic signal including the number of lanes and the intended direction of travel through the lanes, various services may be provided. For example, traffic service providers or traffic management agencies may utilize this information to provide energy savings by reducing unnecessary vehicle acceleration and deceleration by routing vehicles and timing the approach of the vehicles to intersections in such a manner as to pass through more intersections without having to stop at a red light. Additionally, this information may be utilized in order to dynamically adjust navigation plans in order to reduce travel time and/or to more accurately predict the time of arrival at a destination. Still further, this information may be utilized to provide safety warnings, such as alerts to pedestrians having sight limitations who are crossing an intersection.

The information relating to SPaT control strategies for traffic lights and information regarding intersections controlled by the traffic lights may be provided to mobile platforms carried by vehicles traversing the roadways via a cellular network or via dedicated short range communications (DSRC). Although the delivery of this information via a cellular network allows the information to be provided while the vehicles are a long distance from the intersections, cellular networks may suffer from latency issues, such as by having increased latency relative to DSRC, such as a result of backend processing of the information regarding the signal phase and timing of the traffic lights, particularly the more extensive processing required of the information for traffic lights that are actuated. As the traffic phase and timing information for traffic lights is time-sensitive since the signal phases of the traffic lights are repeatedly changing, the latency introduced by a cellular network may prove to be detrimental.

DSRC generally has reduced latency relative to cellular communications. In addition, DSRC is designed, at least in part, to transmit SPaT information for traffic signals. In this regard, the SAE J2735 standard in the DSRC message set dictionary defines the SPaT format which describes the current state of a traffic signal system and the phases corresponding to specific lanes of the intersection. In addition to the SPaT information, the SAE J2735 standard defines the map data format describing the static physical geometric layout of one or more intersections. The map data format is used to convey many types of geographic road information. The map data along with the SPaT information describes an intersection and its current control state through the mapping of lane information for each lane to the corresponding traffic signal group identifier.

Unfortunately, DSRC has a relatively short range, such as a few hundred yards to 1 kilometer. In this regard, DSRC broadcasts signals at a 5.9 gigahertz radio frequency and, as a result, is subject to more environmental interference than signals transmitted by other types of networks, such as cellular networks, that communicate on a point-to-point basis. As a result, the information relating to the traffic signals and corresponding intersections that is transmitted via DSRC may be degraded or even completely blocked, such as due to interference, in some instances. In any event, the interference effectively limits the range at which the traffic signal and intersection information may be received by mobile platforms carried by vehicles. In this regard, to reliably receive information regarding a traffic signal and the corresponding intersection transmitted by a DSRC transmitter proximate the intersection, the vehicle must be relatively near the intersection, while similar information may be received via a cellular network much further from the intersection. Additionally, DSRC has a more limited bandwidth capacity than a cellular network. As such, in instances in which many vehicles are in or near an intersection, such as during rush hour, during or following an incident, such as a traffic accident, at the intersection, during an outage of the traffic signal, etc., the information regarding the traffic signal and the corresponding intersection may not be able to be effectively transmitted, at least not to all of the vehicles in or near the intersection as a result of the limited bandwidth capacity of DSRC.

Thus, while information regarding traffic signals, such as SPaT information, and information regarding the corresponding intersections may be useful for a variety of applications, it has been challenging in some instances to reliably receive the information in a timely manner with mobile platforms in or near an intersection due to various issues associated with the networks via which the information is transmitted.

BRIEF SUMMARY

A method, apparatus and computer program product are provided in accordance with an example embodiment in order to selectively utilize one or more networks in order to reliably communicate the information regarding one or more traffic signals and one or more intersections controlled by respective traffic signals. As such, the network that can most reliably deliver the information, such as to mobile platforms in or near an intersection, may be utilized in order to transmit the information. By selectively switching between the different networks in relation to the transmission of the information regarding one or more traffic signals and the information regarding one or more intersections controlled by respective traffic signals, the mobile platforms, such as may be carried by the vehicles, in or near the intersection can more reliably receive the information, which may, in turn, be used for various purposes including, for example, improved routing, improved arrival prediction, reduced energy consumption and the like.

In an example embodiment, a method is provided that includes communicating with a first network in order to receive information with a mobile platform regarding one or more traffic signals and information regarding one or more intersections. At least one traffic signal is associated with a respective intersection. The method also includes identifying a first switching condition and communicating with a second network, different than the first network, in order to receive the information regarding the one or more traffic signals and the information regarding the one or more intersections following identification of the first switching condition.

The method of an example embodiment also includes maintaining a connection with the first network following identification of the first switching condition and while communicating with the second network. In an example embodiment, the second network has a shorter range and reduced latency relative to the first network. For example, the first network may include a cellular network and the second network may include a dedicated short range communication (DSRC) network. In an example embodiment, the method identifies the first switching condition by identifying an approach of the mobile platform to one of the intersections. The method of an example embodiment also includes identifying a second switching condition and resuming communications with the first network in order to receive the information regarding the one or more traffic signals and the information regarding the one or more intersections following identification of the second switching condition. In this example embodiment, the method identifies the second switching condition by identifying a departure of the mobile platform from one of the intersections.

In another embodiment, an apparatus is provided that includes at least one processor and at least one memory including computer program code with the at least one memory and the computer program code configured to, with the processor, cause the apparatus to at least communicate with the first network in order to receive information with a mobile platform regarding one or more traffic signals and information regarding one or more intersections. At least one traffic signal is associated with the respective intersection. The at least one memory and the computer program code are also configured to, with the processor, cause the apparatus to identify a first switching condition and to communicate with a second network, different than the first network, in order to receive the information regarding the one or more traffic signals and the information regarding the one or more intersections following identification of the first switching condition.

The at least one memory and the computer program code are further configured to, with the processor, cause the apparatus of an example embodiment to maintain a connection with the first network following identification of the first switching condition and while communicating with the second network. In an example embodiment, the second network has a shorter range and reduced latency relative to the first network. For example, the first network may include a cellular network and the second network may include a dedicated short range communication (DSRC) network. The at least one memory and a computer program code are configured to, with the processor, cause the apparatus of an example embodiment to identify the first switching condition by identifying the approach of the mobile platform to one of the intersections. The at least one memory and the computer program code are further configured, with the processor, cause the apparatus of an example embodiment to identify a second switching condition and to resume communications with the first network in order to receive the information regarding the one or more traffic signals and the information regarding the one or more intersections following identification of the second switching condition. The at least one memory and the computer program code are configured to, with the processor, cause the apparatus of an example embodiment to identify the second switching condition by identifying a departure of the mobile platform from one of the intersections.

In a further embodiment, a computer program product is provided that includes at least one non-transitory computer-readable storage medium having computer-executable program code portions stored therein with the computer-executable program code portions including program code instructions configured to communicate with a first network in order to receive information with a mobile platform regarding one or more traffic signals and information regarding one or more intersections. The at least one traffic signal is associated with a respective intersection. The computer-executable program code portions also include program code instructions configured to identify a first switching condition and program code instructions configured to communicate with a second network, different than the first network, in order to receive the information regarding the one or more traffic signals and the information regarding the one or more intersections following identification of the first switching condition.

The program code portions of an example embodiment also include program code instructions configured to maintain a connection with the first network following identification of the first switching condition and while communicating with the second network. In an example embodiment, the second network has a shorter range and reduced latency relative to the first network. For example, the first network may include a cellular network and the second network may include a dedicated short range communication (DSRC) network. The program code portions of an example embodiment also include program code instructions configured to identify a second switching condition and program code instructions configured to resume communications with the first network in order to receive the information regarding the one or more traffic signals and the information regarding the one or more intersections following identification of the second switching condition. In an example embodiment, the program code instructions configured to identify the first switching condition include program code instructions configured to identify an approach of the mobile platform to one of the intersections and the program code instructions configured to identify the second switching condition include program code instructions configured to identify a departure of the mobile platform from one of the intersections.

BRIEF DESCRIPTION OF THE DRAWINGS

Figure 1:
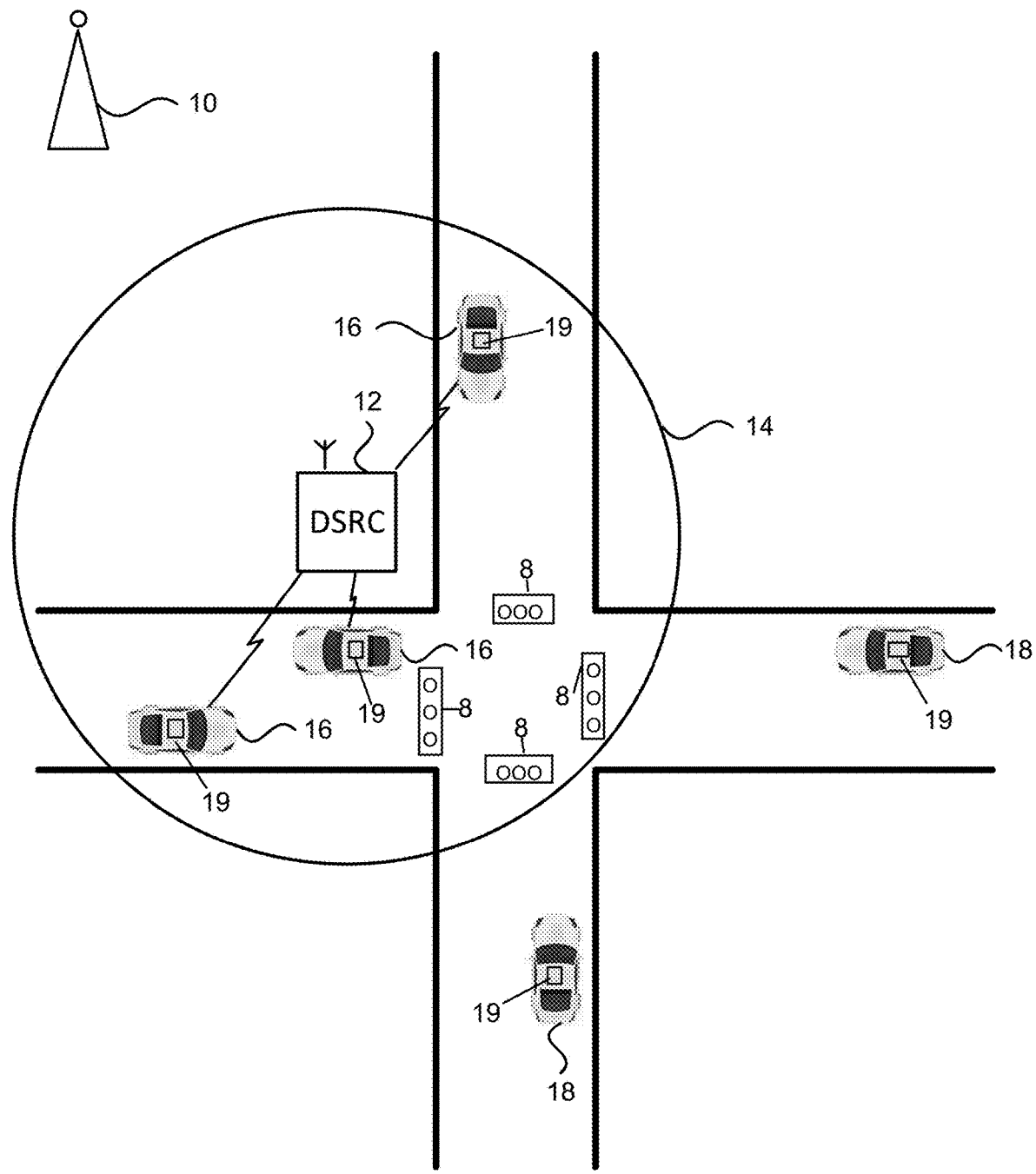
Figure 2:
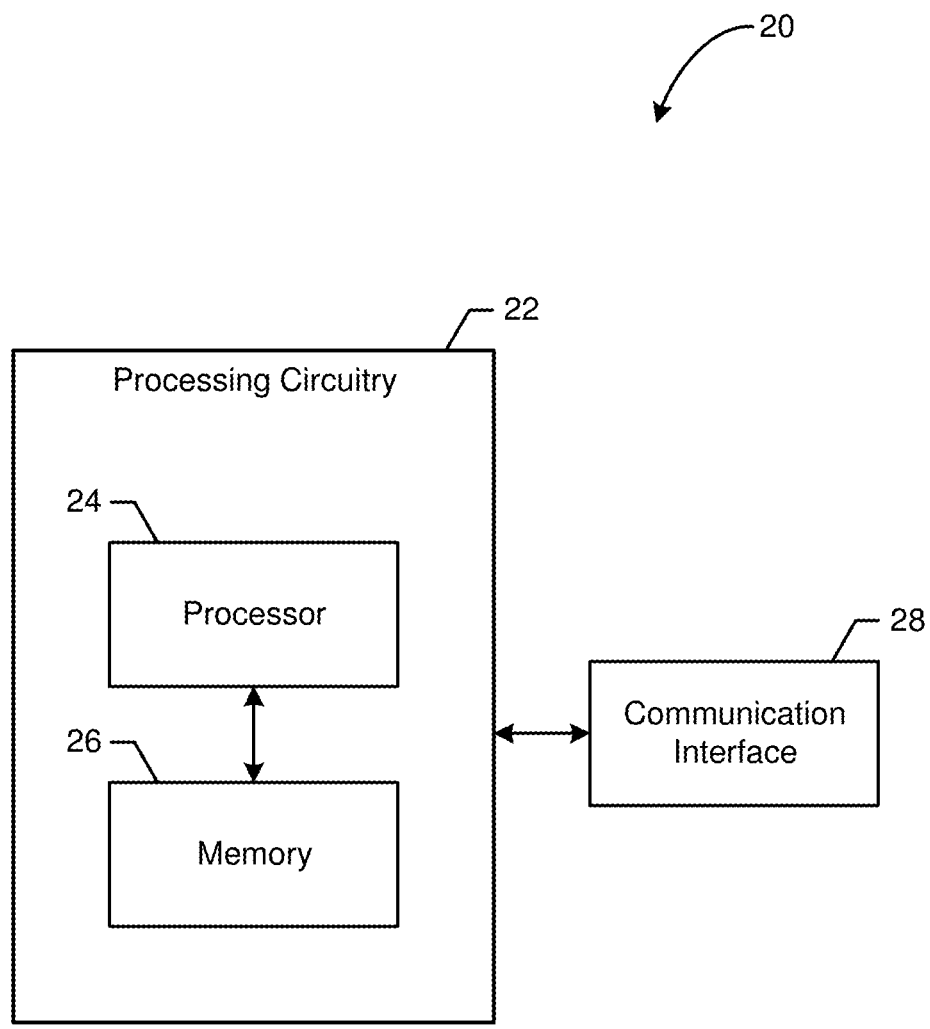
Figure 3:
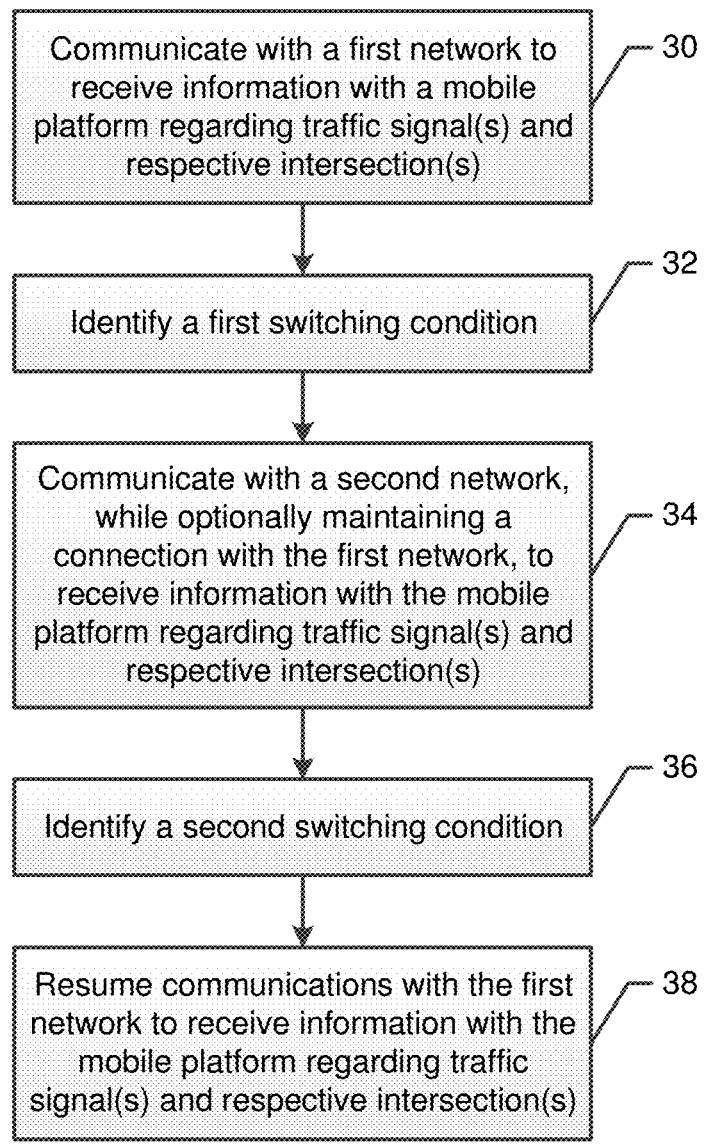
Figure 4:
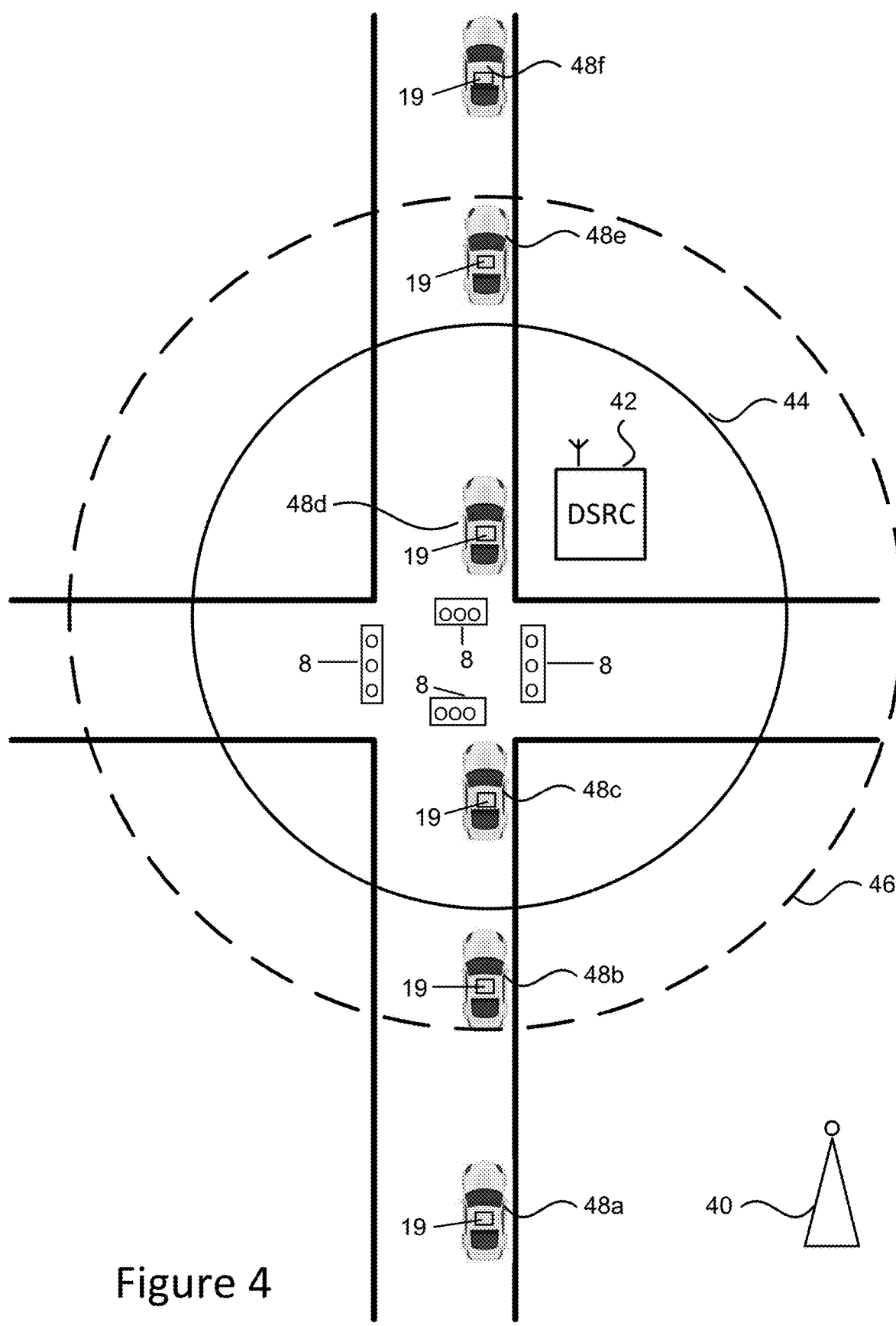

Having thus described certain example embodiments of the present disclosure in general terms, reference will hereinafter be made to the accompanying drawings, which are not necessarily drawn to scale, and wherein:

FIG. 1 illustrates an intersection and vehicles in, near and remote from the intersection which communicate with one or both of a cellular network and/or a dedicated short range communication (DSRC) network;

FIG. 2 is a block diagram illustrating an apparatus configured in accordance with an example embodiment of the present disclosure;

FIG. 3 is a flowchart illustrating operations performed, such as by the apparatus of FIG. 2, in accordance with an example embodiment of the present disclosure; and FIG. 4 illustrates an intersection in which mobile platforms carried by vehicles located in, near or remote from the intersection selectively communicate with either a cellular network or a DSRC network based upon satisfaction of one or more switching conditions in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A method, apparatus and computer program product are provided in accordance with an example embodiment in order to permit a mobile platform, such as may be carried by a vehicle, to selectively communicate with each of a plurality of different types of networks, such as a first and/or second network, in order to optimize or otherwise improve the communication of information regarding one or more traffic signals and information regarding one or more intersections that are controlled by the respective traffic signals. The mobile platform of an example embodiment provides the hardware, software and/or communication environment for vehicle head units or may be embodied by a portable device, such as a smartphone, tablet computer, etc. carried by a vehicle. Thus, the mobile platform will generally be described herein as being carried by a vehicle. However, the mobile platform need not be carried by a vehicle. Instead, the mobile platforms of other embodiments are embodied by portable devices such as smartphones, tablet computers, etc. carried by a pedestrian, by a bicyclist, etc.

As used herein, examples of different types of networks include those that operate in accordance with different communication protocols and/or different standards. Although the mobile platform may communicate with various different types of networks while moving along a roadway, FIG. 1 illustrates an example in which information regarding one or more traffic signals 8 and information regarding one or more respective intersections is provided by a cellular network, such as represented by access point 10, and by a dedicated short range communications (DSRC) network as represented by a DSRC transmitter 12. Various types of cellular networks may be employed including first generation (1G), second generation (2G), 2.5G, third generation (3G), 3.5G, 3.9G, fourth generation (4G), fifth generation (5G) as well as other cellular networks. With respect to DSRC networks, DSRC networks generally operate in the 5.9 GHz band and may have 75 MHz of the spectrum allocated for use by intelligent transportation systems, such as to support the transmission of information relating to traffic signals and the intersections.

As shown in FIG. 1, the DSRC transmitter 12 is generally located proximate an intersection and defines a range within which effective communications may be reliably conducted as represented by circle 14 about the DSRC transmitter. The range of the DSRC transmitter generally includes the intersection and extends a limited distance along the roadways leading to and from the intersection. However, the range of the DSRC transmitter is generally shorter, typically much shorter, than the range of a cellular network. In the example of FIG. 1, the DSRC network can therefore reliably communicate with vehicles 16 within its range 14, but not with vehicles 18 outside of its range. In contrast, the cellular network is configured to communicate with all of the vehicles including both those vehicles 16 in or near the intersection as well as vehicles 18 more remote from the intersection and outside of the DSRC range 14. While the range of a DSRC network may vary depending upon various factors including, for example, transmission power, environmental conditions and the like, the range of a DSRC network may, in one embodiment, have a radius of several hundred meters up to about 1 kilometer from the DSRC transmitter. In contrast, the range of a cellular network is frequently many miles.

However, a DSRC network is generally configured to communicate with the mobile platforms 19 within its range with reduced latency relative to comparable communications transmitted by the cellular network. Further, a DSRC network may be configured to support the SAE J2735 standard and its message set dictionary in order to define the signal phase and timing (SPaT) format describing the current state of a traffic signal system and its phases corresponding to respective lanes of an intersection as well as a map data format describing the static physical geometric layout of one or more intersections. The map data along with the SPaT information therefore relatively fully describes an intersection and its traffic signal control phases.

An apparatus 20 of FIG. 2 is provided in accordance with an example embodiment in order to selectively manage the communications between the mobile platform and multiple different types of networks, such as first and second networks of different types. As such, the apparatus may increase the likelihood that a mobile platform is informed in a timely and efficient manner of information regarding one or more traffic lights and one or more respective intersections. Based upon this information, various functions and applications may be performed including, for example, providing a route that is based at least in part upon the information relating to the traffic signals in order to allow the vehicle to drive from an origin to a destination in a manner that is fuel efficient and/or conducted in the least amount of time with the fewest stops and starts attributable to traffic lights. Moreover, by factoring in the information relating to the traffic signals, the duration of each of a plurality of different routes may be more accurately compared, such as to identify the fastest route, and/or to more precisely identify the anticipated arrival time at a destination.

Although the apparatus 20 may be configured in a variety of different manners, the apparatus of an example embodiment is depicted in FIG. 2 and may be embodied, for example, by a computing device, such as a personal computer, a computer workstation, a laptop computer, a tablet computer or a mobile terminal, such as a smartphone or the like, or by a mapping or navigation system, an advanced driver assistance system (ADAS), a global positioning system (GPS) or the like. The computing device may comprise, be associated with or be in communication with the mobile platform such as may be carried by the vehicle. Alternatively, the computing device may be off board relative to the vehicle, albeit remaining in communication with the mobile platform onboard the vehicle. In embodiments in which the apparatus does not embody the mobile platform, the mobile platform may also be embodied by a computing device of the type described above or by component(s) of such a computing device, such as one or more modems and/or other communication interfaces as described below for communicating with the respective networks. Regardless of the type of computing device that embodies the apparatus, the apparatus of an example embodiment may include, may be associated with or may otherwise be in communication with processing circuitry 22 including, for example, a processor 24 and a memory device 26 as well as a communication interface 28, as shown in FIG. 2.

In some embodiments of the processing circuitry 22, the processor 24 (and/or co-processors or any other circuitry assisting or otherwise associated with the processor) may be in communication with the memory device 26 via a bus for passing information among components of the apparatus 20. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device therefore serves as a computer-readable storage medium, which refers to a physical storage medium (e.g., volatile or non-volatile memory device), and is differentiated from a computer-readable transmission medium, which refers to an electromagnetic signal. The memory device may be configured to store information, data, content, applications, instructions, or the like for enabling the apparatus to carry out various functions in accordance with an example embodiment. For example, the memory device could be configured to buffer input data for processing by the processor. Additionally or alternatively, the memory device could be configured to store instructions for execution by the processor.

As noted above, the apparatus 20 may be embodied by a computing device including those described above. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment on a single chip or as a single "system on a chip." As such, in some cases, a chip or chipset may constitute means for performing one or more operations for providing the functionalities described herein.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment also includes a communication interface 28. The communication interface may be any means such as a device or circuitry embodied in either hardware or a combination of hardware and software that is configured to receive and/or transmit data from/to other electronic devices in communication with the apparatus. In this regard, the communication interface may include, for example, an antenna (or multiple antennas) and supporting hardware and/or software for enabling communications with a plurality of different types of networks, such as first and second types of networks. Additionally or alternatively, the communication interface may include the circuitry for interacting with the antenna(s) to cause transmission of signals via the antenna(s) or to handle receipt of signals received via the antenna(s).

Referring now to FIG. 3, the operations performed, such as by the apparatus 20 of FIG. 2 are depicted in conjunction with the travel of a vehicle over the roadways. As shown in block 30 of FIG. 3, the apparatus includes means, such as the processing circuitry 22, the processor 24, the communication interface 28 or the like, for communicating with a first network to receive information with a mobile platform regarding one or more traffic signals and information regarding one or more intersections. In an embodiment in which the apparatus embodies the mobile platform, the receipt of information with the mobile platform also constitutes the receipt of information by the apparatus. Alternatively, in an embodiment in which the apparatus is separate from but in communication with the mobile platform, communication by the apparatus with the first network may be conducted either directly with the first network or via the mobile platform.

At least one traffic signal is associated with the respective intersection. In an example embodiment depicted in FIG. 4, a vehicle carrying a mobile platform may be travelling along a road, but may still be some distance, such as more than 1 kilometer from an intersection, such as represented by vehicle 48a in FIG. 4. As such, the first network that supports communications of the information regarding one or more traffic signals and information regarding one or more intersections may be a cellular network including access point 40 as a result of the much larger range of the cellular network.

In an instance in which the vehicle is following a predefined route to a destination, the information regarding one or more traffic signals and the information regarding one or more intersections may be information regarding the next intersection that the vehicle will approach along the predefined route as well as information regarding the traffic signal that controls traffic flow through the next intersection that the vehicle will approach. Alternatively, in an instance in which the vehicle is travelling along a roadway, but in which there is no predefined route being followed by the vehicle, the information regarding one or more traffic signals and the information regarding one or more intersections that is provided by the first network and received by the mobile platform carried by the vehicle may include information regarding one or more intersections that are in the vicinity of the vehicle, such as the closest one or more intersections to the current location of vehicle in the direction in which the vehicle is currently traveling, as well as information regarding the traffic signals that control the respective intersections. As to the information regarding the traffic signals and the information regarding the intersections that is received by the mobile platform, the information regarding traffic signals may include SPaT information defining the signal phases and the timing of the traffic signals including traffic signals that are actuated by, for example, vehicular traffic, while the information regarding the intersections may include the physical layout of the intersections including the number of lanes and the direction of travel along the respective lanes.

As shown in block 32 of FIG. 3, the apparatus 20 of an example embodiment includes means, such as the processing circuitry 22, the processor 24 or the like, for identifying a first switching condition. In an example embodiment, the identification of the first switching condition includes the identification of the approach of the mobile platform to one of the intersections. In an example embodiment, a vehicle carrying a mobile platform is defined to be approaching an intersection and to satisfy the first switching condition in an instance in which the vehicle is no more than a predefined distance from the intersection. In this regard, apparatus, such as the processing circuitry, the processor or the like, may determine the position of the vehicle based upon location information, such as from a GPS or other location tracking system. Additionally, in an example embodiment, the predefined distance is based upon the range of a second network, such as a DSRC network. In this regard, in an instance in which the second network, such as a DSRC network, has a predefined range, such as 1 kilometer, the first switching condition may be defined as the approach of the vehicle to within a predefined distance of the intersection with the predefined distance equaling or exceeding the predefined range of the second network, such as by exceeding the predefined range by a predefined buffer distance. The predefined buffer distance may be defined in terms of a predetermined distance to be added to the predefined range of the second network or by a predefined percentage of the predefined range of the second network to be added to the predefined range of the second network. In either instance, the predefined buffer distance may be defined in such as a manner that the time required for the vehicle to travel a distance equal to the predefined buffer distance will be sufficient to permit communication to be established with the second network.

As shown in FIG. 4, for example, the range of the second network, such as a DSRC network, is illustrated by the circle 44. An outer concentric circle 46 is represented by dashed lines and is separated from the circle 44 representative of the range of the second network, e.g., the DSRC network, by the predefined buffer distance. Thus, a vehicle, such as vehicle 48b, that is within the predefined distance of the intersection as defined by the range of the DSRC network plus a predefined buffer distance satisfies the first switching condition such that communications with a first network may be established and commenced prior to or at least by the time that the vehicle reaches the range of a DSRC network as represented by circle 44 in which reliable communications may be conducted between a DSRC transmitter 42 and the mobile platform carried by the vehicle. Although the range and correspondingly the predefined buffer about the range of the DSRC network are depicted as concentric circles, the range and the predefined buffer about the range may have other shapes in other example embodiments depending upon the performance of the DSRC transmitter, environmental conditions of the like.

Although the first switching condition may be defined in terms of a vehicle being no more than a predefined distance from an intersection as described above, the first switching condition may be differently defined in other embodiments. For example, the approach of the vehicle carrying the mobile platform to an intersection may be determined based upon an analysis of one or more signal parameters for signals received from the second network. In this regard, the strength of the signals received from the transmitter 42 of the second network or the signal to noise ratio of the signals received from the transmitter of the second network may be evaluated by the apparatus 20, such as the processing circuitry 22, the processor 24 or the like, and the first switching condition may be determined to have been satisfied in an instance in which the signal strength equals or exceeds a predefined threshold and/or the signal to noise ratio falls below a predefined threshold, thereby indicating that communications via the second network may be reliably conducted. Reliance upon signal parameters to define the first switching condition (and/or the second switching condition discussed below) may be advantageous in situations in which the range of the second network is not necessarily dependent upon a distance, but is dictated more by signal quality degradation, interference or the like.

As shown in block 34 of FIG. 3, the apparatus 20 also includes means, such as the processing circuitry 22, the processor 24, the communications interface 28 or the like, for communicating with a second network, different than the first network, in order to receive the information regarding the one or more traffic signals and the information regarding the one or more intersections following identification of the first switching condition. While a variety of first and second networks may be utilized, the first and second networks are generally of different types and, in one embodiment, are a cellular network and a DSRC network, respectively, as discussed above. With reference to FIG. 4, the vehicles 48*c* and 48*d* are within range of the DSRC network as represented by circle 44 and have satisfied the first switching condition by being no more than a predefined distance, such as defined by circle 46, from the intersection such that communications with the mobile platform carried by vehicles 48*c* and 48*d* are conducted via the DSRC network. As such, the mobile platform carried by the vehicle may receive information regarding the traffic signal and the intersection with reduced latency relative to the provision of the same information by the cellular network.

In some embodiments, the apparatus 20 includes means, such as the processing circuitry 22, the processor 24, the communications interface 28 or the like, for maintaining a connection with the first network following identification of the first switching condition while communicating with the second network, such as while the vehicle is within the range 44 of the second network. By maintaining the connection with the first network, the resumption of communications via the first network as described below may be performed quickly efficiently. Moreover, the maintenance of a connection with the first network provides a second source for the information regarding the traffic signal and the intersection in the event that the second network should experience a problem while the vehicle is within the range of the second network. However, in other embodiments, the connection with the first network is terminated while communications are ongoing via the second network.

As the vehicle leaves the intersection, the communications may return to or shift from second network to the first network again. In this example embodiment, the apparatus 20 of an example embodiment also includes means, such as the processing circuitry 22, the processor 24 or the like, for identifying a second switching condition. In an example embodiment, the second switching condition includes an identification of a departure of the mobile platform from one of the intersections, such as the intersection through which the vehicle most recently passed. The departure of the vehicle carrying the mobile platform from the intersection may be determined in various manners. For example, the departure of the vehicle may be determined based upon the distance of the vehicle from the intersection and the direction of travel of the vehicle away from the intersection. As before, a predefined distance may be defined, such as based upon the sum of the predefined range of the second network and a predefined buffer distance as represented by the dashed circle 46 of FIG. 4. In an instance in which the apparatus, such as the processing circuitry, the processor or the like, determines, such as based upon location information from a GPS or other location tracking system, that the vehicle 48*e* is at least the predefined distance from the intersection and is traveling in a direction away from the intersection, the second switching condition may be determined to have been satisfied. Alternatively, the departure of the vehicle carrying the mobile platform from the intersection may be determined based upon an analysis of one or more signal parameters of signals received from the second network. In this regard, the strength of the signals received from the transmitter 42 of the second network or the signal to noise ratio of the signals received from the transmitter of the second network may be evaluated by the apparatus, such as the processing circuitry, the processor or the like, and the second switching condition may be determined to have been satisfied in an instance in which the signal strength falls below a predefined threshold and/or the signal to noise ratio exceeds a predefined threshold, thereby indicating that further communications via the second network may be increasingly unreliable.

In this example embodiment, the apparatus 20 also includes means, such as the processing circuitry 22, the processor 24, the communications interface 28 or the like, for resuming communications with the first network in order to receive information regarding the one or more traffic signals and information regarding the one or more intersections following identification of the second switching condition. Thus, as the vehicle carrying the mobile platform departs from the intersection and is far enough away from the intersection that the second switching condition is satisfied, communications are resumed with the first network, such as by the vehicle 48*f* of FIG. 4 which is beyond the predefined buffer distance 46. The information regarding one or more traffic signals and the information regarding one or more intersections that is received by the mobile platform once communications with the first network have resumed following departure of the mobile platform from the intersection may include information regarding other intersections, that is, information regarding one or more intersections different than the intersection through which the vehicle just or most recently passed, as well as information regarding traffic signal(s) that control the traffic flow through the respective intersections. For example, this information may relate to the next intersection (and its traffic signal) along the predefined route traveled by the vehicle or, in an instance in which the vehicle is not traveling a predefined route, information regarding one or more nearby intersections and corresponding traffic signals that are proximate the vehicle and in its direction of travel.

As described, the method, apparatus 20 and computer program product of an example embodiment leverage the characteristics of two or more different types of networks in order to reliably and efficiently receive information regarding one or more intersections and one or more traffic signals that control the flow of traffic through respective intersections. Thus, a mobile platform or a computing device in communication with the mobile platform may provide various services based upon the information regarding one or more intersections and one or more traffic signals including, for example, route planning for energy conservation and/or reductions in time of travel, refining arrival times and the like.

As described above, FIG. 3 illustrates a flowchart of an apparatus 20, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 26 of an apparatus employing an embodiment of the present invention and executed by the processor 24 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    as a mobile platform approaches an intersection and communicates with a first network in order to receive information regarding one or more traffic signals, identifying a first switching condition; and
    following identification of the first switching condition, communicating with a second network, different than and having reduced latency relative to the first network, in order for the mobile platform to receive the information regarding the one or more traffic signals.

2. A method according to claim 1 further comprising maintaining a connection with the first network following identification of the first switching condition and while communicating with the second network.

3. A method according to claim 1 wherein the second network has a shorter range relative to the first network.

4. A method according to claim 3 wherein the first network comprises a cellular network and the second network comprises a dedicated short range communications (DSRC) network.

5. A method according to claim 1 wherein identifying the first switching condition comprises identifying that the mobile platform is no more than a predefined distance from the intersection.

6. A method according to claim 1 further comprising:
    identifying a second switching condition; and
    resuming communications with the first network in order to receive the information regarding the one or more traffic signals following identification of the second switching condition.

7. A method according to claim 6 wherein identifying the second switching condition comprises identifying a departure of the mobile platform from one of the intersections.

8. An apparatus comprising at least one processor and at least one memory including computer program code, the at least one memory and computer program code configured to, with the processor, cause the apparatus to at least:
    as a mobile platform approaches an intersection and communicates with a first network in order to receive information regarding one or more traffic signals, identify a first switching condition; and
    following identification of the first switching condition, communicate with a second network, different than and having reduced latency relative to the first network, in order for the mobile platform to receive the information regarding the one or more traffic signals.

9. An apparatus according to claim 8 wherein the at least one memory and computer program code are further configured to, with the processor, cause the apparatus to maintain a connection with the first network following identification of the first switching condition and while communicating with the second network.

10. An apparatus according to claim 8 wherein the second network has a shorter range relative to the first network.

11. An apparatus according to claim 10 wherein the first network comprises a cellular network and the second network comprises a dedicated short range communications (DSRC) network.

12. An apparatus according to claim 8 wherein the at least one memory and computer program code are configured to, with the processor, cause the apparatus to identify the first switching condition by identifying that the mobile platform is no more than a predefined distance from the intersection.

13. An apparatus according to claim 8 wherein the at least one memory and computer program code are further configured to, with the processor, cause the apparatus to:
    identify a second switching condition; and
    resume communications with the first network in order to receive the information regarding the one or more traffic signals following identification of the second switching condition.

14. An apparatus according to claim 13 wherein the at least one memory and computer program code are configured to, with the processor, cause the apparatus to identify the second switching condition by identifying a departure of the mobile platform from one of the intersections.

15. A computer program product comprising at least one non-transitory computer-readable storage medium having computer-executable program code portions stored therein, the computer-executable program code portions comprising program code instructions configured, upon execution by a processor, to cause an apparatus to:

as a mobile platform approaches an intersection and communicates with a first network in order to receive information regarding one or more traffic signals, identify a first switching condition; and following identification of the first switching condition, communicate with a second network, different than and having reduced latency relative to the first network, in order for the mobile platform to receive the information regarding the one or more traffic signals.

16. A computer program product according to claim 15 wherein the program code portions further comprise program code instructions configured, upon execution by the processor, to cause the apparatus to maintain a connection with the first network following identification of the first switching condition and while communicating with the second network.

17. A computer program product according to claim 15 wherein the second network has a shorter range relative to the first network.

18. A computer program product according to claim 17 wherein the first network comprises a cellular network and the second network comprises a dedicated short range communications (DSRC) network.

19. A computer program product according to claim 15 wherein the program code portions further comprise program code instructions configured, upon execution by the processor, to cause the apparatus to:

identify a second switching condition; and resume communications with the first network in order to receive the information regarding the one or more traffic signals following identification of the second switching condition.

20. A computer program product according to claim 19 wherein the program code instructions configured to identify the first switching condition comprise program code instructions configured, upon execution by the processor, to cause the apparatus to identify that the mobile platform is no more than a predefined distance from the intersection, and wherein the program code instructions configured to identify the second switching condition comprise program code instructions configured, upon execution by the processor, to cause the apparatus to identify a departure of the mobile platform from one of the intersections.

* * * * *